Nov. 30, 1937. F. A. BENT ET AL 2,100,425
LACQUER SOLVENT AND THINNER
Filed Aug. 8, 1936
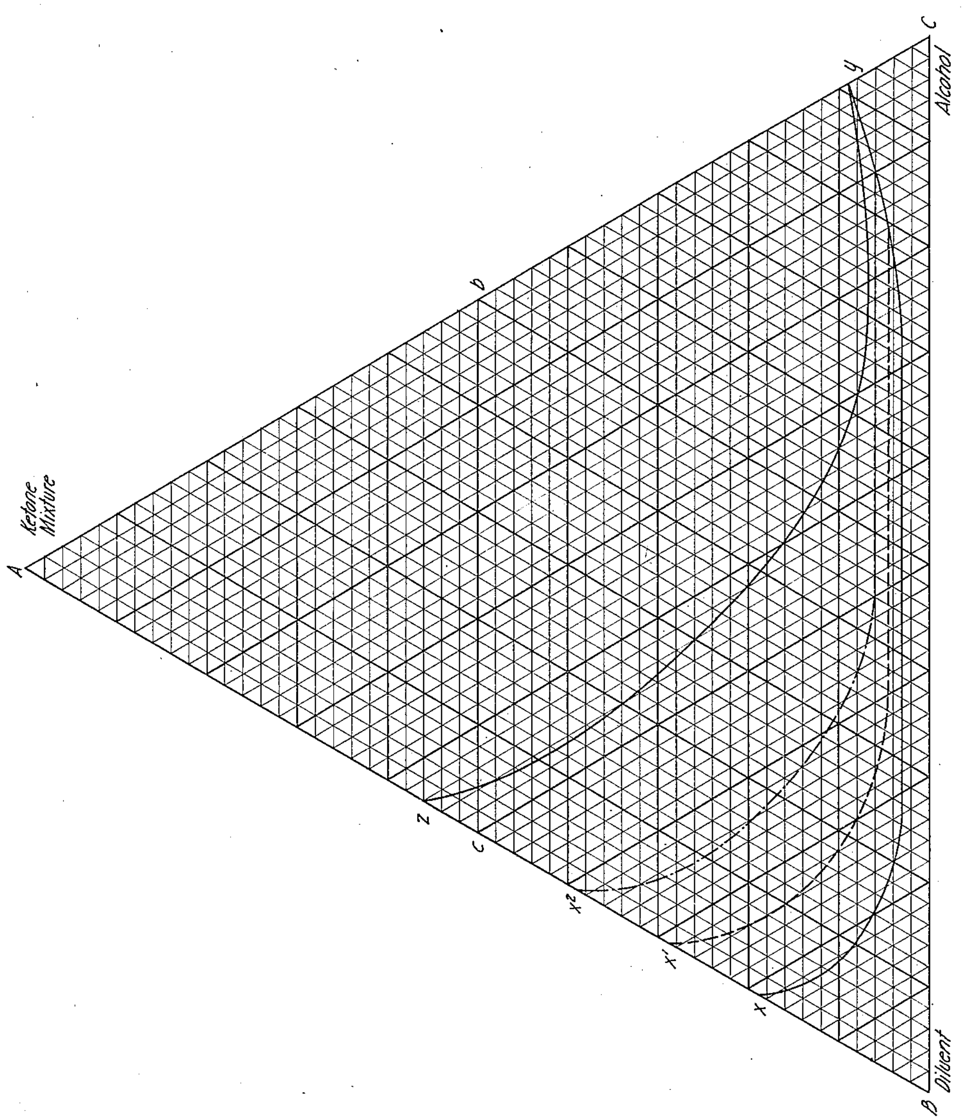
Inventors: Franklin A. Bent
Simon N. Wik
William L. Ponig
By their Attorney: Arthur B Bakalar Patented Nov. 30, 1937

2,100,425

UNITED STATES PATENT OFFICE 2,100,425

LACQUER SOLVENT AND THINNER

Franklin A. Bent and Simon N. Wik, Berkeley, and William Ponig, San Francisco, Calif., assignors to Shell Development Company, San Francisco, Calif., a corporation of Delaware Application August 8, 1936, Serial No. 94,919½

9 Claims. (Cl. 134—79)

This invention relates to the preparation of compositions of matter useful as solvents for cellulose esters, ethers, ether-esters and like derivatives in the preparation of lacquers and lacquer thinners and deals particularly with improved solvent mixtures comprising ketones and alcohols but no effective quantities of organic ester solvents.

One object of our invention is the production of solvent mixtures which not only have a high solvent power for cellulose derivatives, especially nitrocellulose, and yet form solutions of low viscosity but also which have a suitable evaporation range and resistance to humidity which insures deposition of films which are tough, clear and homogeneous. These advantages are combined in our novel mixtures with cheapness of starting materials and stability of the compounded product.

We have found that it is neither necessary nor desirable to have effective amounts of organic esters present in solvent mixtures for cellulose derivatives and that better lacquers and lacquer thinners may be prepared using a mixture of ketones having a smooth evaporation curve and one or more alcohols, preferably of similar evaporation characteristics. By properly proportioning the alcohol content to the amount of mixed ketones used, solvent mixtures may be prepared which are capable of much higher dilution with the usual diluents, particularly aromatic diluents, than has been considered possible with prior solvents.

In the liquid solvent compositions of our invention the proportions of the ingredients, i. e. ketone mixtures, alcohol or alcohols and diluent or mixed diluents may be varied quite widely depending upon the cellulose derivative or derivatives with which the solvent is to be used, the use to which the finished product is to be put, the nature of the various components chosen, particularly the gums, resins, plasticizers and like ingredients used in the preparation of lacquers, the evaporation rate desired, the excess tolerance specified, and like factors.

A wide variety of ketones, alcohols and diluents may be used in the liquid solvent compositions of our invention. As components of the ketone mixtures which are suitable in our products are included both aliphatic, carbocyclic and aromatic ketones. Typical aliphatic ketones which may be included in the ketone mixture used are, for example, saturated ketones such as: acetone, methyl-ethyl ketone, methyl-propyl ketone, methyl-isopropyl ketone, diethyl ketone, ethyl-propyl ketone, methyl-n-butyl ketone, methyl-secondary butyl ketone, methyl-tertiary butyl ketone, di-propyl ketone, di-isopropyl ketone, propyl-isopropyl ketone, ethyl-butyl ketone, methyl-amyl ketone, di-isobutyl ketone, methyl-n-hexyl ketone and higher homologues and unsaturated ketones, such as methyl vinyl ketone, vinyl acetone, allyl acetone, mesityl oxide, propyl-allyl ketone, etc. Cyclic and aromatic ketones such as cyclobutanone, cyclopentanone, cyclohexanone, acetophenone, benzophenone, etc. may also be present in the ketone mixtures used. The ketones are preferably chosen according to their evaporation rates to include fast, medium and slow evaporating ketones so as to obtain a smooth evaporation curve. Three or more aliphatic ketones differing in carbon content by, preferably, not more than two carbon atoms per molecule between individual compounds and covering a range of difference of not less than two carbon atoms per molecule provide such suitable evaporating mixtures. Thus, for example, a mixture of methyl-ethyl ketone, di-ethyl ketone and methyl-butyl ketone or a mixture of methyl-ethyl ketone, mesityl oxide and di-propyl ketone may be used. In some cases, however, two ketones may be sufficient to produce the desired evaporating range. The alcohol or alcohols used are chosen with respect to the ketone mixture with which they are to be used so as to produce mixtures in which the solvent balance will be preserved during evaporation. Typical preferred combinations include, for example, methyl alcohol with methyl-ethyl ketone, ethyl alcohol (preferably anhydrous) with methyl-propyl ketone, isopropyl alcohol with di-ethyl and/or methyl-isobutyl ketones, secondary and/or tertiary butyl alcohol with mesityl oxide and/or methyl-n-butyl ketone, n-butyl and/or secondary amyl alcohols with methyl-n-amyl ketone, methyl-amyl alcohol with cyclohexanone, etc. Thus in general, aliphatic alcohols which have two or three less carbon atoms than the aliphatic ketones with which they are used are preferred, although a single alcohol or any number of alcohols having suitable evaporation characteristics, may be used.

The diluent or diluent mixture used is similarly chosen to have a rate of evaporation in the presence of the cellulose derivative with which it is to be applied which is similar to, or preferably faster than, the rate of evaporation of the ketone mixture with which it is to be used. Thus with ketone mixtures which are highly volatile such as those containing acetone, methyl-ethyl ketone, etc., benzol is suitable, while with methyl-propyl and/or methyl-isobutyl ketones, for example, toluene is more advantageous. Monochlorbenzene, butylene di-chloride and analogous halogenated hydrocarbons are useful in mixtures containing mesityl oxide, methyl-n-butyl ketone, etc. Slower evaporating mixtures containing dipropyl ketone, methyl-n-amyl ketone and the like more preferably contain diluents such as xylene. Diluents of an aliphatic nature may be used in place of the above described aromatic diluents provided they are so chosen that the resulting mixtures will evaporate at the same rates. Mixed aromatic-aliphatic diluents may also be used. In all cases higher dilution ratios are possible by the use of aromatic diluents than with diluents preponderantly of an aliphatic nature. Since aromatic compounds are less desirable, from an economic standpoint, in the range of dilution ratios in which diluents preponderantly composed of aliphatic compounds may be successfully used, we preferably employ aromatic diluents in such proportions to the solvent mixture, i. e. ketone mixture plus alcohol, as are at least equal to about the maximum proportions of preponderantly aliphatic diluents of similar evaporation rate which will form a solution of the cellulose derivative involved of the same concentration.

For the purpose of making our invention more clear it will be described with more particular reference to the accompanying drawing in which the limiting solubility of ½ second nitrocellulose at a concentration of 8% in systems composed of the three components (1) a typical ketone mixture consisting of methyl-ethyl, methyl-propyl and methyl-butyl ketones (2) any aliphatic alcohol and (3) diluent, have been plotted on triangular coordinates. In this drawing all compositions represented by points above curve $x$—$y$ will dissolve at least 8% by weight of nitrocellulose when the diluent contains only aromatic compounds. All compositions above curve $z$—$y$ will dissolve at least 8% by weight of nitrocellulose when the diluent contains substantially only open-chain compounds. Compositions below their respective curves will dissolve less than 8% of nitrocellulose when the corresponding diluents are used.

It is obviously not desirable in preparing 8% nitrocellulose solutions to use the exact compositions indicated by curves $x$—$y$ with aromatic diluents or $z$—$y$ with aliphatic diluents since these curves represent maximum "dilution ratios", defined as the ratio of the weight of diluent to the weight of solvent (ketone mixture and alcohol or alcohols) at which the mixture just ceases to be a solvent for nitrocellulose at 8% final concentration. Compositions corresponding to points above the respective curves are therefore necessary. The distance above the limiting curve in question which it will be desirable to choose will depend upon the excess tolerance required in the solvent mixture, that is the amount of additional solvent which may be added to one pound of mixture before causing precipitation of nitrocellulose. This may conveniently be calculated according to the equation $$\frac{B-x}{1+x}=\text{excess tolerance}$$

where B=the dilution ration and $x$=weight of diluent which is added to the solvent to give the required excess tolerance. Curves $x^1$—$y$ and $x^2$—$y$ show the proportions of aromatic diluent, ketone mixture and alcohol or alcohols of two or more carbon atoms which will form 8% solutions of ½ second nitrocellulose having excess tolerances of 0.5 and 1.0 respectively.

It is clear from the drawing that a mixture of about the following composition is particularly advantageous since it contains the maximum weight of diluent:

| | Percent |
|---|---|
| Aromatic diluent | 83 |
| Ketone mixture | 12 |
| Alcohol or alcohols | 5 |

That the composition of such mixtures is the same for different systems, i. e., different ketones with different aliphatic alcohols and aromatic hydrocarbons have the same relative composition at the maximum dilution ratio, is shown by the following table:

*Compositions of ternary mixtures containing maximum amount of toluene*

| Percent ketone | Percent alcohol | Percent toluene |
|---|---|---|
| 12% methyl ethyl ketone | 5% ethyl alcohol | 83 |
| 12% methyl ethyl ketone | 5% isopropyl alcohol | 83 |
| 12% methyl ethyl ketone | 5% n-butyl alcohol | 83 |
| 12% methyl ethyl ketone | 5% s-butyl alcohol | 83 |
| 12% methyl ethyl ketone | 5% t-butyl alcohol | 83 |
| 13% methyl ethyl ketone | 5% methyl alcohol | 82 |
| 12% methyl propyl ketone | 5% ethyl alcohol | 83 |
| 12% methyl propyl ketone | 5% isopropyl alcohol | 83 |
| 12% methyl propyl ketone | 5% n-butyl alcohol | 83 |
| 12% methyl propyl ketone | 5% s-butyl alcohol | 83 |
| 12% methyl propyl ketone | 5% t-butyl alcohol | 83 |
| 13% methyl propyl ketone | 5% methyl alcohol | 82 |

In general, compositions corresponding to points above the maximum dilution curve (curve $x$—$y$ for the systems shown in the drawing) and on or below the maximum open-chain hydrocarbon dilution curve (curve $z$—$y$ for the systems shown in the drawing) are useful when diluents other than open-chain compounds are employed, while compositions corresponding to points above the maximum dilution curve for open-chain hydrocarbons are used only when diluents which are predominantly of that type are resorted to. Hydro-aromatic compounds, such as cyclohexane, and mixtures of aromatic and open-chain compounds and other suitable diluents which have higher dilution ratios than products containing substantially only open-chain compounds may be used in the same proportions as such open-chain compounds if desired but preferably are employed in larger amounts.

Except in special cases, as where lacquer concentrates which are to be diluted before applications are prepared, we prefer to use compositions containing less than 50% alcohol as large amounts of alcohol simply act in part as diluents. Particularly useful are those compositions containing an alcohol-ketone-mixture ratio of about 0.25 to about 0.75 to 1 or more preferably about 0.25 to about 0.55 to 1, by weight as in these ranges the maximum dilution at each concentration of nitrocellulose may be had. In general mixtures containing at least about 25% diluent, whatever its nature, are preferred.

Suitable compositions for lacquer formulation may contain, for example, from 3 to 55% of a mixture of ketones, from 1 to 50% of alcohol and from 44 to 83% of aromatic hydrocarbon. The ketone portion of the mixture is most suitably made up of at least three different ketones covering a range of evaporation of fast, medium and slow evaporating ketones in the proportion of about 20 to 40% by weight of the faster evaporating ketone, about 25 to 50% of the medium evaporating ketone and about 20 to 40% of the slower evaporating ketone. In some instances two ketones may be sufficient in which case preferable proportions are about 50 to 70% medium or slow evaporating ketone and the remainder faster evaporating ketone. Where the composition is to have a medium evaporation rate, the ketone mixture may suitably be made up, for example, of methyl-isobutyl ketone 20 to 40%, methyl-n-butyl ketone 25 to 50% and methyl-secondary amyl ketone 20 to 40%. With such a ketone mixture the alcohol content of the solvent composition may advantageously be made up, for example, of isopropyl alcohol 20 to 40%, secondary butyl alcohol 25 to 50% and isobutyl alcohol 20 to 40%, while the diluent may be toluene alone or a mixture of about 70% toluene and 30% xylene or a mixture of intermediate composition.

Solvents of higher evaporation rate may be prepared using a ketone mixture composed of, for example, methyl-ethyl ketone 20 to 40%, methyl-isobutyl ketone 25 to 55% and mesityl oxide 20 to 40%. A suitable alcohol mixture for use in this case may comprise methyl alcohol 20 to 40%, ethyl alcohol 25 to 55% and tertiary butyl alcohol 20 to 40%. With these mixtures benzol or benzol-toluene mixtures up to equal parts by weight may be used.

Where diluents preponderantly made up of open-chain compounds are to be used, the proportions of ingredients may, for example, be of the order of 14 to 74% of ketone mixture, from about 1 to about 50% alcohol content and from about 25 to about 45% of diluent. The nature and proportions of the individual ketones and alcohols may be the same as those described above as suitable with aromatic diluents or may differ therefrom in accordance with the use to which the mixture is to be put.

Examples of typical mixtures which are suitable as nitrocellulose solvents are as follows:

*Example I*

| Ingredients | Percent (by weight) |
|---|---|
| Methyl ethyl ketone | 4.0 |
| Methyl propyl ketone | 4.0 |
| Methyl butyl ketone | 5.0 |
| Ethyl alcohol | 3.0 |
| Isopropyl alcohol | 3.0 |
| Secondary butyl alcohol | 3.0 |
| Toluene | 52.0 |
| Xylene | 26.0 |
| | 100.0 |

*Example II*

| Ingredients | Percent (by weight) |
|---|---|
| Methyl ethyl ketone | 8.6 |
| Methyl propyl ketone | 9.2 |
| Secondary butyl alcohol | 15.1 |
| Methyl amyl ketone | 9.3 |
| Petroleum hydrocarbon | 57.8 |
| | 100.0 |

While we have described our invention with more particular reference to the preparation of mixtures especially suitable for production of the standard 8% solutions of ½ second nitrocellulose this has been for the purpose of illustration only and it will be understood that we are not to be limited thereto as our novel compositions are not only advantageous with nitrocellulose of other viscosities, particularly 6 second nitrocellulose for example, and other concentrations especially higher concentrations, but also may be applied as solvent for other cellulose derivatives including other esters such as cellulose xanthate, acetate, propionate, butyrate, etc. (whether mixed esters or not) and ethers, for example, the methyl, ethyl, propyl, butyl and/or amyl ethers of cellulose (whether iso or straight chain or primary, secondary or tertiary in character) as well as their corresponding ether-esters. It will of course be recognized that these various derivatives will in each case have different solubility limits in the solvent mixtures of our invention which will require corresponding changes in the proportions of the preferred mixtures but in all cases the most advantageous solvent mixture will be one containing a plurality of ketones, at least one alcohol and a diluent in such proportions that where the diluent is of an aromatic character the diluent content is at least equal to the maximum proportions of open-chain diluent which would form an otherwise similar solution.

Our novel products have many advantages over prior lacquer solvents and thinners. As a result of the substantial elimination of organic esters they are stable and do not liberate corrosive organic acid by hydrolysis during storage and may safely be kept in metallic containers. The high solvent power of the ketones results in cellulose derivative solutions of low viscosity making it possible to spray higher concentrations and/or more viscous grades of cellulose derivatives than has heretofore been practical. By proper proportioning of the components larger amounts of diluent may be added and/or cheaper open-chain hydrocarbon compounds may be used. Furthermore, by the use of diluents and alcohols which have evaporation rates in the presence of the cellulose derivative involved substantially corresponding to the rates of evaporation of the ketone mixture used, the absorption of water during the whole drying time of the lacquer film resulting in smooth films of high resistance to humidity, i. e. substantially zero blush.

We claim as our invention:

1. A liquid solvent mixture suitable for the manufacture of lacquers and lacquer thinners which has a high solvent power for cellulose ethers, esters and ether-esters and forms therewith solutions of high concentration and low viscosity characterized by having a smooth evaporation curve over a wide range and high resistance to humidity during drying resulting in the deposition of films of the cellulose derivative which are clear, tough, homogeneous and substantially devoid of blush, said solvent mixture consisting of from 3% to 74% by weight of a mixture of ketones having a smooth evaporation curve, from 1% to 50% by weight of an alcohol, and from 25% to 83% by weight of a conventional liquid hydrocarbon diluent material, the alcohol-content and the hydrocarbon-content of the mixture having evaporation rates similar to the evaporation rate of the ketone mixture, said solvent mixture having ketone mixture and hydrocarbon diluent ranges of 3% to 55% by weight and 44% to 83% by weight, respectively, when the diluent is an aromatic hydrocarbon, and ketone mixture and hydrocarbon diluent ranges of 14% to 74% by weight and 25% to 45% by weight, respectively, when the diluent is an aliphatic hydrocarbon, whereby the solvent mixture is evaporative without any substantial variation in the ketone to alcohol ratio therein.

2. A liquid solvent mixture suitable for the manufacture of lacquers and lacquer thinners which has a high solvent power for cellulose ethers, esters and ether-esters and forms therewith solutions of high concentration and low viscosity characterized by having a smooth evaporation curve over a wide range and high resistance to humidity during drying resulting in the deposition of films of the cellulose derivative which are clear, tough, homogeneous and substantially devoid of blush, said solvent mixture consisting of from 3% to 55% by weight of a mixture of ketones having a smooth evaporation curve, 1% to 50% by weight of at least one alcohol, and from 44% to 83% by weight of an aromatic hydrocarbon diluent the alcohol-content and the hydrocarbon-content of the mixture having evaporation rates similar to the evaporation rate of the ketone mixture whereby the solvent mixture is evaporative without any substantial variation of the ketone to alcohol therein.

3. A liquid solvent mixture suitable for the manufacture of lacquers and lacquer thinners which has a high solvent power for cellulose ethers, esters and ether-esters and forms therewith solutions of high concentration and low viscosity characterized by having a smooth evaporation curve over a wide range and high resistance to humidity during drying resulting in the deposition of films of the cellulose derivative which are clear, tough, homogeneous and substantially devoid of blush, said solvent mixture consisting of from 12% to 25% by weight of a mixture of aliphatic ketones having a smooth evaporation curve, 5% to 10% by weight of a mixture of aliphatic alcohols, and 66% to 83% by weight of an aromatic hydrocarbon diluent, the alcohol-content and the hydrocarbon-content of the mixture having evaporation rates similar to the evaporation rate of the ketone mixture whereby the solvent mixture is evaporative without any substantial variation in the ketone to alcohol ratio therein.

4. A liquid solvent mixture suitable for the manufacture of lacquers and lacquer thinners which is capable of dissolving a sufficient amount of one-half second nitrocellulose to form at least an 8% by weight solution thereof which has a low viscosity and is characterized by having a smooth evaporation curve over a relatively long drying period and high resistance to humidity during drying resulting in deposition of nitrocellulose films which are clear, tough, homogeneous and substantially devoid of blush consisting of from 12% to 25% by weight of a mixture of aliphatic ketones having a smooth evaporation curve, 5% to 10% by weight of a mixture of aliphatic alcohols, and 66% to 83% by weight of an aromatic hydrocarbon diluent, the alcohol-content and the hydrocarbon-content of the mixture having evaporation rates similar to the evaporation rate of the ketone mixture whereby the solvent mixture is evaporative without any substantial variation in the ketone to alcohol ratio therein.

5. A liquid solvent mixture suitable for the manufacture of lacquers and lacquer thinners which has a high solvent power for cellulose ethers, esters and ether-esters and forms therewith solutions of high concentration and low viscosity characterized by having a smooth evaporation curve over a wide range and high resistance to humidity during drying resulting in the deposition of films of the cellulose derivative which are clear, tough, homogeneous and substantially devoid of blush, said solvent mixture consisting of 12% by weight of a mixture of aliphatic ketones, 5% by weight of at least one aliphatic alcohol, and 83% by weight of an aromatic diluent, the alcohol-content and the hydrocarbon-content of the mixture having evaporation rates similar to the evaporation rate of the ketone mixture whereby the solvent mixture is evaporative without any substantial variation in the ketone to alcohol ratio therein.

6. A liquid solvent mixture suitable for the manufacture of lacquers and lacquer thinners which has a high solvent power for cellulose ethers, esters and ether-esters and forms therewith solutions of high concentration and low viscosity characterized by having a smooth evaporation curve over a wide range and high resistance to humidity during drying resulting in the deposition of films of the cellulose derivative which are clear, tough, homogeneous and substantially devoid of blush, said solvent mixture consisting of 13% by weight of a mixture of substantially equal weight proportions of three different aliphatic ketones containing four, five and six carbon atoms, respectively, 9% by weight of a mixture of substantially equal weight proportions of three different aliphatic alcohols containing two, three and four carbon atoms, respectively, and 78% by weight of an aromatic hydrocarbon diluent having an evaporation rate similar to the evaporation rates of the ketone and alcohol mixtures, whereby the solvent mixture is evaporative without any substantial variation in the ketone to alcohol ratio therein.

7. A liquid solvent mixture suitable for the manufacture of lacquers and lacquer thinners which has a high solvent power for cellulose ethers, esters and ether-esters and forms therewith solutions of high concentration and low viscosity characterized by having a smooth evaporation curve over a wide range and high resistance to humidity during drying resulting in the deposition of films of the cellulose derivative which are clear, tough, homogeneous and substantially devoid of blush, said solvent mixture consisting of 27% by weight of a mixture of substantially equal proportions of three different aliphatic ketones containing four, five and seven carbon atoms, respectively, 15% by weight of an aliphatic alcohol containing four carbon atoms, and 58% by weight of a petroleum hydrocarbon fraction having an evaporation rate similar to the evaporation rate of the ketone mixture and the alcohol, whereby the solvent mixture is evaporative without any substantial variation in the ketone to alcohol ratio therein.

8. A liquid solvent mixture suitable for the manufacture of lacquers and lacquer thinners which has a high solvent power for cellulose ethers, esters and ether-esters and forms therewith solutions of high concentration and low viscosity characterized by having a smooth evaporation curve over a wide range and high resistance to humidity during drying resulting in the deposition of films of the cellulose derivative which are clear, tough, homogeneous and substantially devoid of blush, said solvent mixture consisting of 13% by weight of a mixture of aliphatic ketones containing substantially equal weight proportions of methyl ethyl ketone, methyl propyl ketone and methyl butyl ketone, 9% by weight of a mixture of aliphatic alcohols containing substantially equal weight proportions of ethyl alcohol, isopropyl alcohol and secondary butyl alcohol, 52% by weight of toluene and 26% by weight of xylene, said solvent mixture being evaporative without substantial change in the ketone to alcohol ratio therein.

9. A liquid lacquer composition of low viscosity which is suitable for spraying and characterized by having a smooth evaporation curve over a wide range and a high resistance to humidity during drying resulting in the deposition of films which are clear, tough, homogeneous and substantially devoid of blush, said composition containing 8% by weight of one-half second nitrocellulose dissolved in a liquid solvent consisting of 12% by weight of a mixture of aliphatic ketones having a smooth evaporation curve, 5% by weight of at least one aliphatic alcohol, and 83% by weight of an aromatic hydrocarbon diluent, the alcohol-content and the hydrocarbon- content of the mixture having evaporation rates similar to the evaporation rate of the ketone mixture whereby the composition is evaporative without substantial change in the ketone to alcohol ratio therein.

FRANKLIN A. BENT.
SIMON N. WIK.
WILLIAM PONIG.